(12) United States Patent
Yeo et al.

(10) Patent No.: US 10,351,103 B2
(45) Date of Patent: Jul. 16, 2019

(54) LIDAR DEVICE WITH HEATED COVER USEFUL FOR AUTOMATED VEHICLES

(71) Applicant: Aptiv Technologies Limited, St. Michael (BB)

(72) Inventors: Kok Wee Yeo, Singapore (SG); Yew Kwang Low, Singapore (SG); Binghua Pan, Singapore (SG)

(73) Assignee: APTIV TECHNOLOGIES LIMITED (BB)

( * ) Notice: Subject to any disclaimer, the term of this patent is extended or adjusted under 35 U.S.C. 154(b) by 49 days.

(21) Appl. No.: 15/720,729

(22) Filed: Sep. 29, 2017

(65) Prior Publication Data

US 2019/0100167 A1 Apr. 4, 2019

(51) Int. Cl.
| | |
|---|---|
| B60Q 1/00 | (2006.01) |
| B60S 1/02 | (2006.01) |
| B32B 33/00 | (2006.01) |
| H05B 6/64 | (2006.01) |
| B60S 1/56 | (2006.01) |
| H05B 1/02 | (2006.01) |

(52) U.S. Cl.
CPC .............. B60S 1/023 (2013.01); *B32B 33/00* (2013.01); *B32B 2307/41* (2013.01); *B32B 2307/412* (2013.01); *B32B 2307/416* (2013.01); *B60S 1/56* (2013.01); *H05B 1/0236* (2013.01); *H05B 6/6482* (2013.01)

(58) Field of Classification Search
CPC .............. B23B 33/00; B23B 2307/41; B23B 2307/412; B23B 2307/416; B60S 1/023; B60S 1/56; H05B 1/0236; H05B 6/6482

USPC ........ 362/276, 458, 507, 509–510, 538–540, 362/543–547
See application file for complete search history.

(56) References Cited

U.S. PATENT DOCUMENTS

2015/0055115 A1 2/2015 Pedersen et al.
2015/0346328 A1 12/2015 Rondeau et al.

FOREIGN PATENT DOCUMENTS

| DE | 10 2014 110504 A1 | 1/2016 |
| EP | 2 950 117 A1 | 12/2015 |
| WO | 2013/139347 A1 | 9/2013 |

OTHER PUBLICATIONS

European Search Report for Application No. 18197223.3, European Patent Office, dated Feb. 14, 2019.

*Primary Examiner* — Jason M Han
(74) *Attorney, Agent, or Firm* — Lawrence D. Hazelton

(57) ABSTRACT

An illustrative example embodiment of a detector device includes a sensor portion that is configured to at least emit or receive a first type of radiation. A cover near the sensor portion is transparent to the first type of radiation to allow the first type of radiation to pass through the cover. A radiation source emits a second, different type of radiation. A plurality of reflecting surfaces are transparent to the first type of radiation and at least partially opaque to the second type of radiation to at least partially reflect the second type of radiation into the cover to increase a temperature of at least a portion of the cover.

20 Claims, 3 Drawing Sheets

LIDAR DEVICE WITH HEATED COVER USEFUL FOR AUTOMATED VEHICLES

BACKGROUND

Innovations in electronics and technology have made it possible to incorporate a variety of advanced features on automotive vehicles. Various sensing technologies have been developed for detecting objects or monitoring the surroundings in a vicinity or pathway of a vehicle. Such systems are useful for parking assist, lane departure detection and cruise control adjustment features, for example.

More recently, automated vehicle features have become possible to allow for autonomous or semi-autonomous vehicle control. Sensors for such systems may incorporate LIDAR (light detection and ranging) or RADAR for detecting an object or another vehicle in the pathway of or otherwise near the vehicle.

Environmental conditions may be limiting on the availability or effectiveness of such sensing technologies. For example, in colder climates it is possible for ice or condensation to form or collect on the sensor window or casing. In those cases, the LIDAR transmission, reception or both may be compromised or even blocked entirely.

Known heating technologies to prevent ice build-up tend to introduce additional complications or interfere with proper LIDAR sensor operation. For example, known heating circuits or coatings for windows or other surfaces interfere with or block LIDAR transmission through the window and, therefore, are not useful with LIDAR sensors. Other known options include separate heaters but those introduce other complications, such as providing a mounting location and wiring to power and control the heater.

The availability and reliability of LIDAR sensing technologies for automotive vehicles would be enhanced by a solution to the problem discussed above.

SUMMARY

An illustrative example embodiment of a detector device includes a sensor portion that is configured to at least emit or receive a first type of radiation. A cover near the sensor portion is transparent to the first type of radiation to allow the first type of radiation to pass through the cover. A radiation source emits a second, different type of radiation into the cover. A plurality of reflecting surfaces are transparent to the first type of radiation and at least partially opaque to the second type of radiation to at least partially reflect the second type of radiation into the cover to increase a temperature of at least a portion of the cover.

An illustrative example embodiment of a vehicle headlamp includes a light source and a cover near the light source. A sensor is situated near the cover such that the sensor at least emits or receives a first type of radiation through the cover. A plurality of reflecting surfaces are transparent to the first type of radiation and at least partially opaque to a second, different type of radiation. At least one separator separates at least the second type of radiation from light emitted by the light source and directs the second type of radiation into the cover where the reflecting surfaces at least partially reflect the second type of radiation within the cover to increase a temperature of at least a portion of the cover.

An illustrative example method of adjusting a temperature of a detector device cover that is transparent to a first type of radiation includes emitting a second, different type of radiation into at least a portion of the cover. The second type of radiation is reflected within the portion of the cover to increase a temperature of at least the portion of the cover.

Various features and advantages of at least one disclosed embodiment will become apparent to those skilled in the art from the following detailed description. The drawings that accompany the detailed description can be briefly described as follows.

DETAILED DESCRIPTION

Embodiments of this invention include detector devices that provide an ability to reduce or remove ice or condensation from the device to increase the availability and effectiveness of the detector device in a wider range of environmental conditions. Such devices are useful for a variety of vehicle applications, such as detectors on automated vehicles or semi-autonomous vehicles. Such detectors are also useful for assisting drivers of automotive vehicles.

Figure 1:
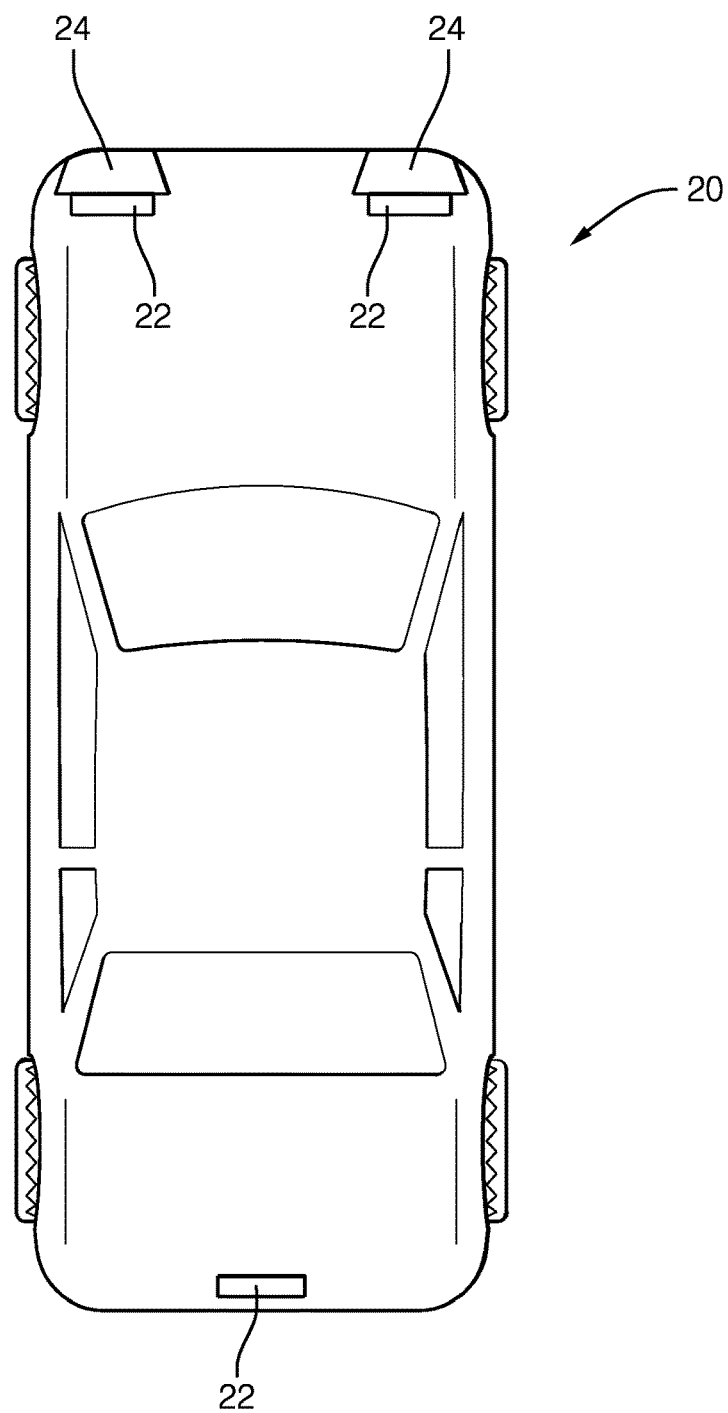
FIG. 1 schematically illustrates a vehicle including detector devices designed according to an embodiment of this invention.

FIG. 1 schematically illustrates an example vehicle 20 including detector devices 22 that are configured for use with LIDAR sensing or signaling techniques. The devices 22 are useful, for example, for detecting objects in a vicinity or pathway of the vehicle 20. As schematically shown in FIG. 1, two of the detector devices 22 are associated with a headlamp 24 of the vehicle 20. At least one other detector device 22 is separate from a light source on the vehicle 20. A variety of placements of detector devices 22 on a vehicle are possible.

Figure 2:
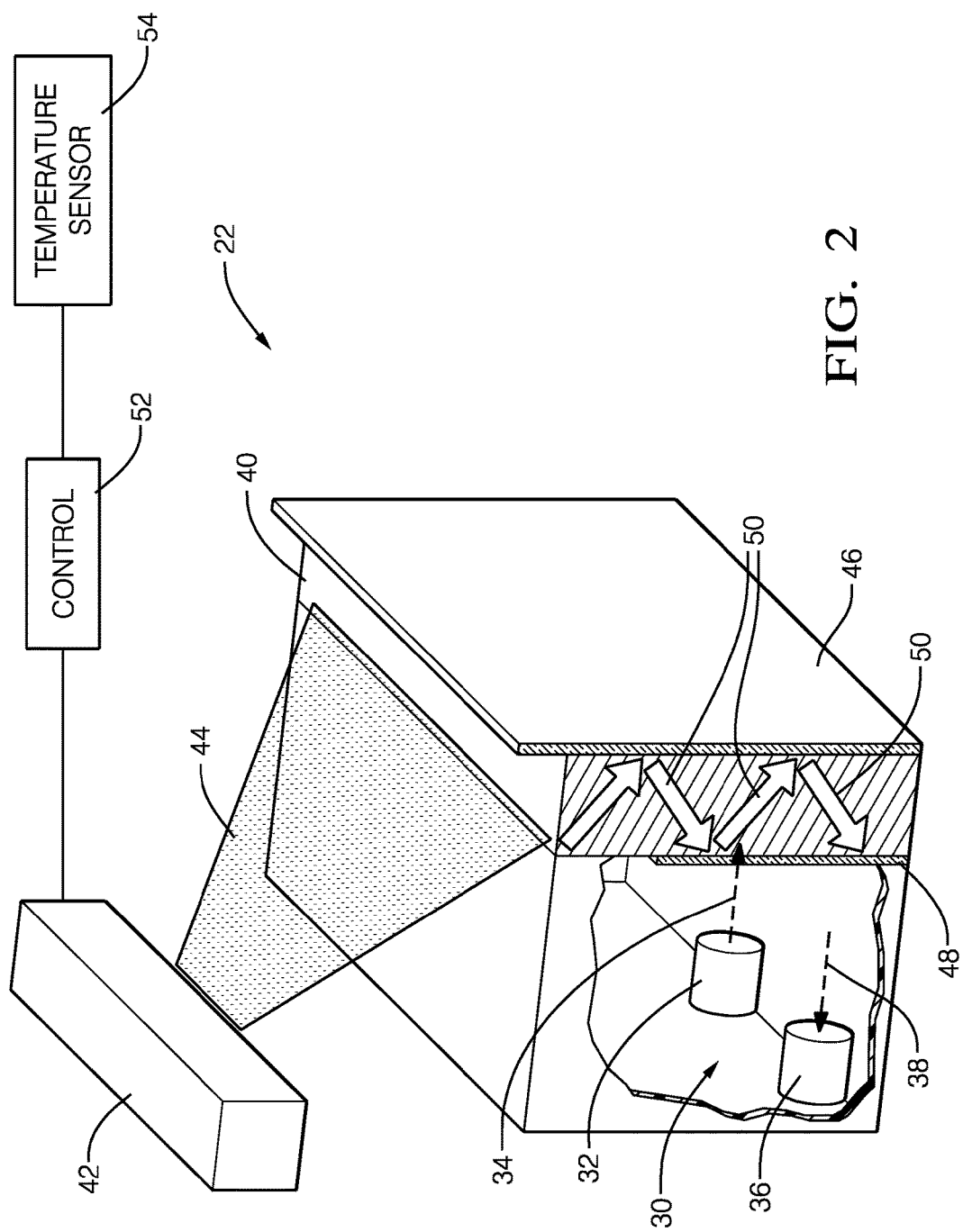
FIG. 2 schematically illustrates selected components of an example detector device designed according to an embodiment of this invention.

FIG. 2 schematically illustrates an example configuration of at least one of the detector devices 22. A sensor portion 30 includes a transmitter or emitter 32 that emits a first type of radiation schematically shown at 34. A detector or receiver 36 detects at least some the first type of radiation that reflects off of an object (not illustrated) as schematically shown at 38. In some embodiments the first type of radiation comprises LIDAR radiation. The device 22 includes a cover or lens 40 that is transparent to the first type of radiation to allow the first type of radiation to pass through the cover 40. The cover 40 may comprise glass or a plastic material, for example.

A source 42 of a second type of radiation schematically shown at 44, is situated to emit the second type of radiation 44 into the cover 40. A plurality of reflecting surfaces 46 and 48 are transparent to the first type of radiation 34, 38 and at least partially opaque to the second type of radiation 44. The reflecting surfaces 46 and 48 are situated relative to the cover 40 for reflecting at least a portion of the second type of radiation 44 into or within the cover 40. The source 42 directs the second type of radiation at an oblique angle relative to at least a portion of the reflecting surface 46 to facilitate reflection in the cover 40 between the reflecting surfaces 46 and 48. Such reflected radiation is schematically shown at 50 in the drawing.

In the illustrated example, the second type of radiation 44 comprises infrared radiation. Reflecting infrared radiation within the cover 40 increases a temperature of at least the portion of the cover 40 where the infrared radiation is reflected. In some embodiments the temperature of the entire cover 40 will increase as a result of the reflected second type of radiation.

The reflecting surfaces 46 and 48 in some embodiments are secured to outer surfaces of the cover 40. Coatings or films may serve as the reflecting surfaces 46 and 48. Another embodiment includes at least one of the reflecting surfaces 46 and 48 in the cover 40 instead of being on an outside or outer surface of the cover. For example, the cover 40 may include a reflective layer inside the body of the cover 40. In another example embodiment, at least one of the reflecting surfaces 46 or 48 is separate from the cover 40 but positioned near it to accomplish the type of reflection schematically shown in FIG. 2.

In one example embodiment, the reflecting surfaces 46 and 48 comprise a coating on outer surfaces of the cover 40. One such coating is a band pass filter commercially available from Alluxa. The filter in such an embodiment is selected to allow the first type of radiation to pass through the filter but not the second type of radiation. Other filters may be used as one or both of the reflecting surfaces 46, 48. In some embodiments, at least one of the reflecting surfaces 46 or 48 comprises a grating.

Given this description, those skilled in the art will realize that there are a variety of ways to incorporate a plurality of reflecting surfaces like the surfaces 46 and 48 into a detector device to establish a portion of a cover 40 within which radiation, such as infrared radiation, will be reflected for purposes of heating at least that portion of the cover. The reflecting surfaces may be a coating on the cover 40, a film on or in the cover 40, a layer on or in the cover 40, a grating near on or in the cover 40, a filter near on or in the cover 40, or a combination of those.

The example device in FIG. 2 includes a controller 52 that obtains information from at least one sensor 54 regarding environmental conditions, such as ambient temperature and humidity, or a temperature of the cover 40. When the conditions are conducive to condensation or ice build-up (e.g., the ambient temperature is sufficiently low) that could interfere with the first type of radiation passing through the cover 40, the controller 52 causes the source 42 of the second type of radiation to emit that radiation into the cover 40.

In some embodiments, the controller 52 receives input from a manual selector device that is available to a driver of a vehicle, for example, when heating the cover 40 is desired by that individual.

Figure 3:
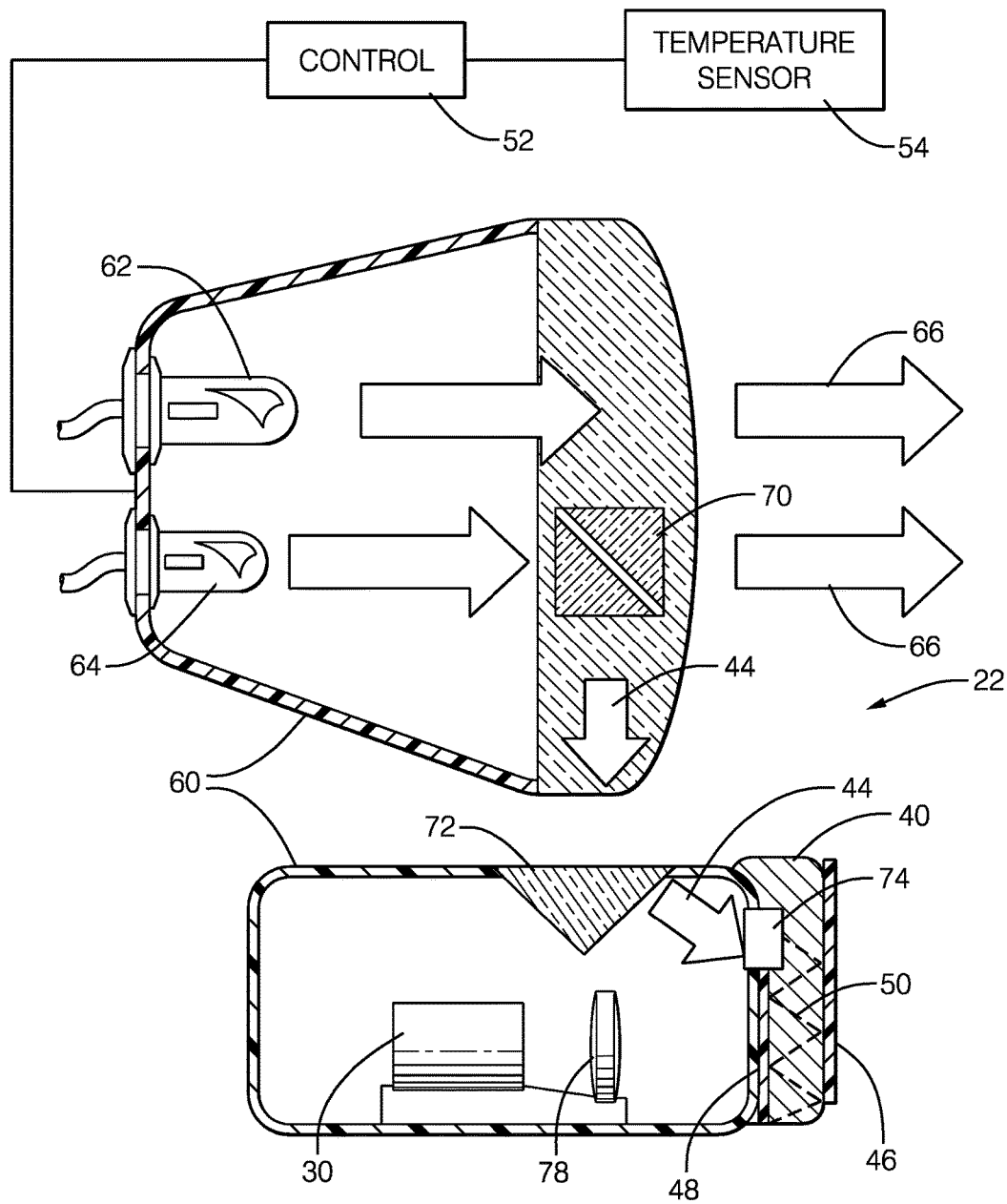
FIG. 3 schematically illustrates selected components of a vehicle headlamp including an example detector device designed according to an embodiment of this invention.

FIG. 3 schematically illustrates an example embodiment where the detector device 22 is incorporated as part of a vehicle headlamp assembly 60. In this example, the headlamp assembly 60 includes multiple light sources or bulbs 62 and 64. In normal operating conditions, visible light 66 is emitted by the bulbs 62 and 64 for illuminating the area in front of the vehicle 20, for example. In the illustrated embodiment, a separator 70 is situated in a pathway of at least some of the light emitted by at least the bulb 64. The separator 70 separates out at least some of the second type of radiation 44 from the light 66. In one example, the separator 70 comprises a dichrolic prism configured to split infrared radiation from the light emitted by at least the bulb 64. In another example, the separator 70 comprises a grating that is configured to deflect or separate out infrared radiation from the light 66.

A beam director 72 directs the second type of radiation 44 through a window or optical coupler 74 into the optical cover 40. The reflecting surfaces 46 and 48 reflect the second type of radiation 44 within lid 40 as schematically shown at 50. The reflected radiation within the cover 40 increases the temperature of at least that portion of the cover 40.

The reflecting surfaces 46 and 48 are at least partially opaque to the second type of radiation such that at least some of the second type of radiation is reflected within the cover 40. In some instances, some of the second type of radiation will pass through or extend beyond one or both of the reflecting surfaces 46, 48. Provided that at least some of the radiation is reflected as schematically shown at 50, a desired heating effect will be achieved.

Given that some of the second type of radiation may pass through the reflecting surface 48, a filter 78 is situated between the cover 40 and the sensor portion 30 to prevent any of such stray radiation of the second type from interfering with the operation of the sensor portion 30.

In the illustrated example of FIG. 3, the cover 40 near the sensor portion 30 is shown separate from the cover of the headlamp portion of the assembly. In other embodiments the sensor portion 30 is situated in the headlamp housing and the cover 40 is the cover for the entire headlamp assembly 60.

The disclosed example embodiments have the ability to reduce or eliminate condensation or ice build-up on a cover or lens associated with a detector device. The disclosed example embodiments increase the reliability and availability of such detector devices for a wider range of environmental conditions.

While specific features or components are shown in connection with an example embodiment, those features or components are not necessarily limited to just that embodiment. Other combinations of the disclosed example features and components are possible to realize additional embodiments.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A detector device, comprising:
   a sensor portion that is configured to at least emit or receive a first type of radiation;
   a cover near the sensor portion, the cover is transparent to the first type of radiation to allow the first type of radiation to pass through the cover;
   a radiation source that emits a second type of radiation into the cover, the second type of radiation is different than the first type of radiation; and
   a plurality of reflecting surfaces that are transparent to the first type of radiation and at least partially opaque to the second type of radiation to at least partially reflect the second type of radiation in the cover to increase a temperature of at least a portion of the cover.

2. The detector device of claim 1, wherein the first type of radiation comprises LIDAR radiation.

3. The detector device of claim 1, wherein the second type of radiation comprises infrared light.

4. The detector device of claim 1, wherein the reflecting surfaces respectively comprise at least one of
   a coating on the cover,
   a film on or in the cover,
   a layer on or in the cover,
   a grating near, on or in the cover, and
   a filter near, on or in the cover.

5. The detector device of claim 1, wherein at least one of the reflecting surfaces is an outer surface of the cover.

6. The detector device of claim 5, wherein the cover has outer surfaces on opposite sides of the cover and the reflecting surfaces are respectively on the outer surfaces of the cover.

7. The detector device of claim 1, wherein the radiation source emits the second type of radiation at an oblique angle relative to at least a portion of at least one of the reflecting surfaces.

8. The detector device of claim 1, comprising a separator that is configured to separate the second type of radiation from other radiation emitted by the radiation source, wherein the separated second type of radiation is directed toward at least one of the reflecting surfaces.

9. The detector device of claim 8, wherein the separator comprises at least one of a prism or a grating.

10. The detector device of claim 8, wherein the radiation source comprises a headlamp light.

11. A method of adjusting a temperature of a detector device cover that is transparent to a first type of radiation, the method comprising:
    emitting a second type of radiation, wherein the second type of radiation is different from the first type of radiation; and
    reflecting at least some of the second type of radiation from a plurality of reflecting surfaces that are transparent to the first type of radiation and at least partially opaque to the second type of radiation in at least a portion of the cover to thereby increase a temperature of at least the portion of the cover.

12. The method of claim 11, wherein the first type of radiation comprises LIDAR radiation.

13. The method of claim 11, wherein the second type of radiation comprises infrared light.

14. The method of claim 11, comprising
    separating the second type of radiation from other radiation emitted by a radiation source; and
    directing the separated second type of radiation toward at least one of the reflecting surfaces.

15. The method of claim 11, wherein at least one of the reflecting surfaces is an outer surface of the cover.

16. A vehicle headlamp assembly, comprising:
    at least one light source;
    a sensor portion that is configured to at least emit or receive a first type of radiation;
    a cover near the sensor portion, the cover is transparent to the first type of radiation to allow the first type of radiation to pass through the cover;
    a separator that separates a second type of radiation from light emitted by the light source, the second type of radiation is different than the first type of radiation; and
    a plurality of reflecting surfaces that are transparent to the first type of radiation and at least partially opaque to the second type of radiation, the plurality of reflecting surfaces being situated to at least partially reflect the second type of radiation in the cover to increase a temperature of at least a portion of the cover.

17. The vehicle headlamp assembly of claim 16, comprising a deflector that directs the separated second type of radiation toward at least one of the reflecting surfaces at an oblique angle relative to at least a portion of the at least one of the reflecting surfaces.

18. The vehicle headlamp assembly of claim 16, wherein the separator comprises at least one of a dichroic prism and a grating.

19. The vehicle headlamp assembly of claim 16, wherein the reflecting surfaces respectively comprise at least one of
    a coating on the cover,
    a film on or in the cover,
    a layer on or in the cover,
    a grating near, on or in the cover, and
    a filter near, on or in the cover.

20. The vehicle headlamp assembly of claim 16, wherein the first type of radiation comprises LIDAR radiation; and the second type of radiation comprises infrared radiation.

* * * * *